(12) United States Patent
Falaschi et al.

(10) Patent No.: US 10,385,923 B2
(45) Date of Patent: Aug. 20, 2019

(54) BEARING HOUSING IN PARTICULAR DESIGNED FOR THE FOOD INDUSTRY

(71) Applicant: Aktiebolaget SKF, Gothenburg (SE)

(72) Inventors: Fabio Falaschi, Carrara (IT); Fausto Baracca, Massa (IT)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/559,590

(22) PCT Filed: Mar. 24, 2016

(86) PCT No.: PCT/IB2016/000373
§ 371 (c)(1),
(2) Date: Sep. 19, 2017

(87) PCT Pub. No.: WO2016/156964
PCT Pub. Date: Oct. 6, 2016

(65) Prior Publication Data
US 2018/0045248 A1 Feb. 15, 2018

(30) Foreign Application Priority Data
Mar. 31, 2015 (IT) .................. 102015000010466

(51) Int. Cl.
*F16C 35/04* (2006.01)
(52) U.S. Cl.
CPC .......... *F16C 35/045* (2013.01); *F16C 35/047* (2013.01)

(58) Field of Classification Search
CPC .... F16C 33/723; F16C 35/042; F16C 35/045; F16C 35/047
See application file for complete search history.

(56) References Cited

U.S. PATENT DOCUMENTS

| | | | |
|---|---|---|---|
| 2,695,201 A * | 11/1954 | Leister | F16C 23/084 384/495 |
| 3,724,917 A | 4/1973 | Pakulak | |
| 3,910,386 A * | 10/1975 | Stigall | B60T 8/329 188/181 R |
| 6,089,758 A | 7/2000 | Ward | |

FOREIGN PATENT DOCUMENTS

| | | |
|---|---|---|
| CN | 201034121 Y | 3/2008 |
| CN | 103061837 A | 4/2013 |
| EP | 1065394 A1 | 1/2001 |

* cited by examiner

*Primary Examiner* — James Pilkington
(74) *Attorney, Agent, or Firm* — Bryan Peckjian; SKF USA Inc. Patent Dept.

(57) ABSTRACT

Bearing housing including a housing element designed to be adapted to receive internally a bearing, and a fastening base or flange to a frame of machinery provided with through holes for screws or bolts and having a shoulder face intended to go into use in contact against the frame of the machine equipment, the face of the shoulder being traversed by through holes. The housing element is made of a synthetic molded plastic material and the base or flange has its shoulder face covered by a layer of elastomeric material which has been molded integrally fixed in one piece with the base or flange.

7 Claims, 2 Drawing Sheets

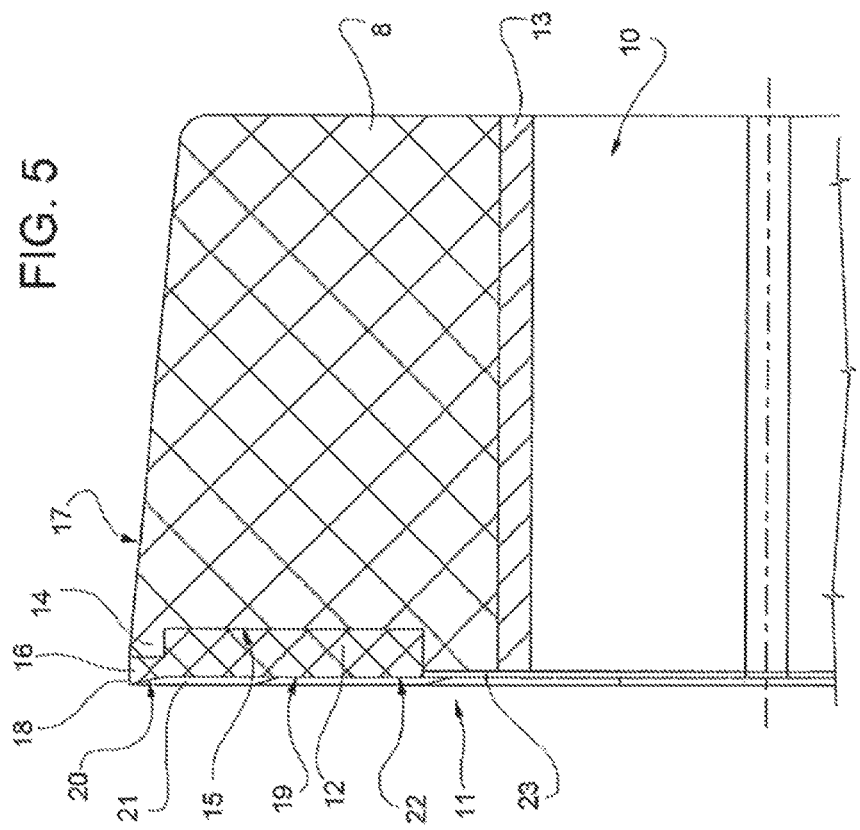
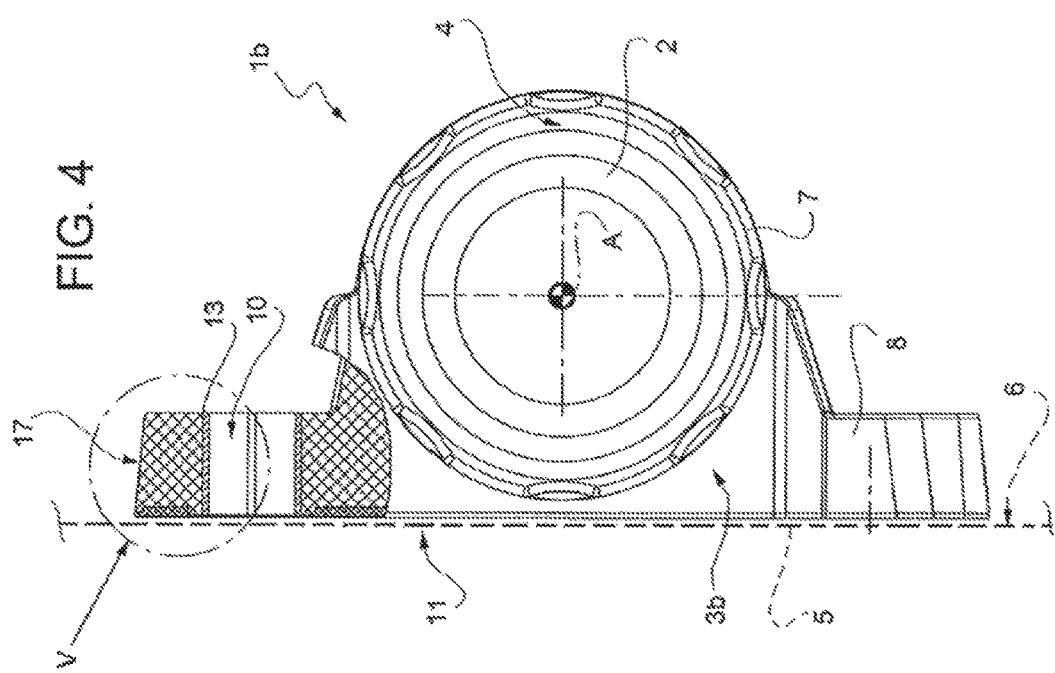

BEARING HOUSING IN PARTICULAR DESIGNED FOR THE FOOD INDUSTRY

CROSS REFERENCE

This is a United States National Stage Application claiming the benefit of International Application Number PCT/IB2016/000373 filed on Mar. 24, 2016, which claims the benefit of Italian Patent Application 102015000010466 filed on Mar. 31, 2015, both of which are incorporated herein by reference in their entireties.

Technical Field of Invention

The present invention relates to a bearing housing, in particular intended to be mounted on machines for the food industry, as well as to a support assembly for rotating shafts including such a housing and a bearing, for example a rolling bearing.

Known Art

As it is known, the machines used in the food industry have many moving parts supported by rotary and/or sliding trees, think for example conveyor belts, kneading machines, machines for washing of fresh food.

All these machines must be cleaned frequently, usually with water added with detergent and/or disinfectants, in order to check the possible occurrence of bacterial colonies which may pollute foods. It is in particular necessary that each of these machines not present in the interstices, or discontinuity, where dirt or even only the washing water can penetrate and stagnate. The stagnation of liquids or moisture favors in fact a possible proliferation of bacteria.

This problem is particularly felt with respect to the complex support of the rotary or sliding trees. These complex support are in fact formed by a housing element, generally annular, provided with a base or mounting flange to the machinery, and by a bearing, typically a rolling bearing (but can also be a sliding bearing), mounted inside of the housing and which is coupled with the movable shaft.

In fact, where the base or the flange is fixed to the machine, usually by screws or bolts, they inevitably form the interstices where the liquid can penetrate and stagnate.

SUMMARY OF INVENTION

The object of the present invention is to provide a bearing housing, in particular intended to be mounted on machines for the food industry, as well as a support assembly for rotating or sliding shafts including such a housing and a bearing, which avoid the stagnation of liquids or dirt, which present reduced dimensions and that they are simple and economic to implement.

According to the invention it is thus provided a bearing housing, in particular intended to be mounted on machines for the food industry, as well as a support assembly for rotating or sliding shafts including such a housing and a bearing having the characteristics set forth in the claims annexed.

BRIEF DESCRIPTION OF DRAWINGS

The invention will now be described with reference to the accompanying drawings, which illustrate a non-limiting embodiment thereof, in which.

Figure 1:
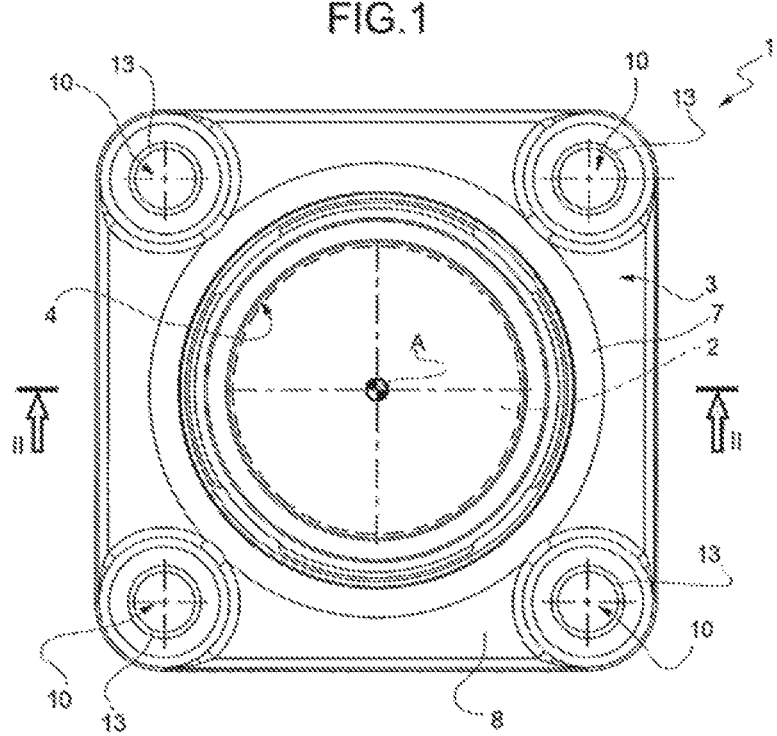
FIG. 1 schematically shows a view in elevation and cross-section along a radial plane of a hub bearing unit produced according to Functional the invention.
Figure 2:
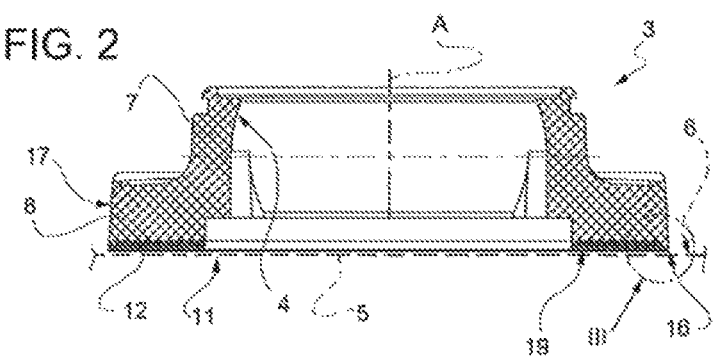
FIG. 2 shows a detail of the hub bearing unit in FIG. 1 on an enlarged scale.
Figure 3:
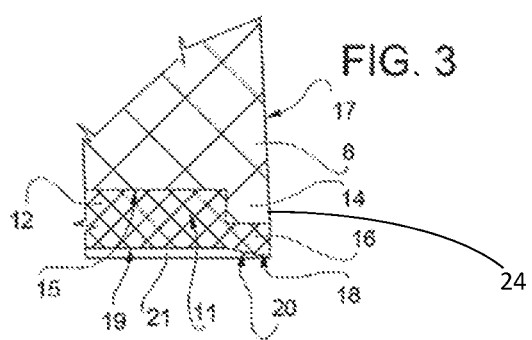

The invention will now be described with reference to the accompanying drawings, which illustrate a non-limiting example of embodiment thereof, wherein:

FIG. 1 shows a front elevational view of a first embodiment of a support assembly for shafts according to the invention, where a rolling bearing is shown for simplicity only schematically and in broken lines;

FIG. 2 shows a section along a line II-II of a bearing housing element forming part of the support assembly of FIG. 1;

FIG. 3 illustrates in enlarged scale and in section a detail III of the element of FIG. 2 housing;

FIG. 4 shows a front view in elevation and partially in section of a second embodiment of a support assembly for shafts according to the invention; IS FIG. 5 illustrates in enlarged scale and in section a detail V of the support assembly of FIG. 4.

DETAILED DESCRIPTION

With reference to FIGS. 1 to 3, number 1 indicates as a whole a support assembly for furniture shafts, rotating or sliding, not illustrated for simplicity, and comprising a bearing 2, for example a rolling bearing, known and illustrated only as a block in broken lines for simplicity, to act in a known manner to receive a movable shaft, for example rotating, to support it and a bearing housing 3 having a through seat 4 within which is received the bearing 2 in a stable and known manner, therefore, not shown for simplicity.

The bearing housing 3 is illustrated in radial section and in more detail in FIGS. 2 and 3. The bearing housing 3 is of the type intended to be rigidly mounted on a frame 5 of a known type of machine, shown hatched only in part in FIG. 2, in particular against a flat surface 6 of a machine frame 5 for the food industry.

The bearing housing 3 comprises a housing element 7, in the annular complex, designed so as to be adapted to receive in a known manner, to its interior, in particular in the seat 4, the bearing 2, and a base or flange 8 of fastening to the machine frame 5; the seat 4 in general presents an axis of symmetry A and the bearing 2 is generally mounted in the seat 4 coaxial with the axis A; in the case illustrated the seat 4 has a curved lateral surface to allow the possible oscillations of the bearing 2 in order to compensate for any misalignment.

The base or flange 8 is provided with through holes 10 for screws or bolts or other fasteners (known and not illustrated for simplicity) through/which the base or flange 8 and with it the whole support assembly 1 are fixed to the flat surface of the frame 6 5.

For this purpose, the base or flange 8 has a face 11 of the shoulder (FIGS. 2 and 3) intended to go into use in contact against the flat surface 6 of the machine frame 5 and crossed by the through holes 10.

According to a feature of the invention, the element of housing 7 and illustrated in the example of preferred implementation, the entire bearing housing 3 (and thus also the base or flange 8) is/are made of/for the molding in a polymeric material, preferably but not necessarily in a synthetic plastic material, for example injection molded; in combination with such a choice of material, the base or flange 8 presents his own face of shoulder 11 coated with a layer 12 of elastomeric material fixed integral in one piece with the/at the base or flange 8 and it is intended in use to go directly in contact with the surface 6 to be gripped, in fixing the base or flange 8 to the frame 5 occurred through the tightening of the cited known and not illustrated screws, between the face of shoulder 11 and the flat surface 6, so that the housing of the bearing 3 does not rest directly against the frame 5, but only with the interposition of the layer of elastomer 12.

According to a further feature of the invention, the layer of elastomeric material 12 that covers the shoulder face 11 of the base or flange 8 has been molded in one piece integral with the base or flange 8, using a compatible elastomeric material with the polymeric material with which is made of the housing element 3 and the base or flange 8 is integral in one piece with the housing element 7, having been molded in one piece integral with the housing element 7.

In particular, the housing element 7, which is provided with the through seat 4, and the base or flange 8 are formed in a single piece by molding of a polymeric material, preferably but not necessarily of a synthetic plastic loaded with a fibrous filler reinforcing and compatible with the elastomeric material of the layer 12. According to a preferred embodiment of the invention, the housing element 7 and the base or flange 8 are made by molding in a single piece of a polypropylene charged with glass fiber, for example to the extent of between 30 and 50% by weight.

Furthermore, the base or flange 8 is provided in correspondence of the through holes 10 of the metal reinforcing sleeves 13 that laterally delimit the through holes 10 and which have been co-molded with the base or flange 8 perpendicular to the shoulder face 11.

According to a further aspect of the invention, the base or flange 8 presents the side of his shoulder face 11 and along all its perimeter an annular edge 14 (FIG. 3), which projects cantilevered with respect to the face of shoulder 11 in a direction substantially perpendicular to the base or flange 8 and which delimits within the base or flange 8 and the side of the face of shoulder 11, in the present case on the face of shoulder 11, a first shallow 15.

The layer of elastomeric material 12 fills the shallow 15 and has a height greater than a cantilevered extension of the annular edge 14 with respect to the face of shoulder 11, so as to protrude frontally with respect to the annular edge 14, which, according to an aspect of the invention, it contains/ holds radially in a continuous way for at least a part of the height (or thickness) of the layer 12 equal to the depth of the shallow 15.

A peripheral edge 16 of the layer 12 of elastomeric material 12 is extended to completely cover the front and the annular edge 14 coming flush with a side wall 17 of the base or flange 8 (FIG. 3). The farthest extending edge of the side wall 17 forms a housing peripheral edge 24. The layer of elastomeric material 12 may have an annular lip 18 along the housing peripheral edge 24. The annular lip 18 may also border a frusto-conical shallow 21, also called a fusto contical recess in the claims, in the layer of elastomeric material. The peripheral edge 16 of the layer of elastomeric material 12 is preferably flush with the side wall 17 of the base or flange 8.

Moreover, the peripheral edge 16 of the layer 12 of elastomeric material form on the opposite side to the base or flange 8 a continuous annular lip 18, elastically deformable, which extends projecting from a front face 19 of the layer of elastomeric material 12, which is substantially parallel to the face 11 of the shoulder.

According to another feature of the invention, the annular lip 18 is delimited by a front surface 20 having frusto-conical taper facing towards the base or flange 8; for "taper" of a conical or frusto-conical surface means the side towards which is directed the vertex of the geometric cone delimiting this surface.

In this way, the annular lip 18 has a progressively increasing thickness towards the side wall 17 of the base or flange 8 and delimits on the front face 19 of the layer 12 of elastomeric material according to a shallow 21 (also referred to in the claims as "a frusto-conical recess") (FIG. 3).

With reference to FIGS. 4 and 5, where details similar or identical to those already described are indicated for simplicity with the same reference numerals, there is shown a support assembly 1b which differs from the support assembly 1 already described only for the shape and orientation of the base or flange 8.

In particular, 1b of the support assembly for a movable shaft (known and not illustrated for simplicity) includes a bearing 2, in the present case a rolling bearing 2, 3b and a bearing housing which in turn comprises a housing element 7 for the bearing 2, having a through seat 4 having a symmetry axis a and a base or flange 8 is provided with through holes 10 delimited by metal bushes 13.

While in the housing of the bearing case 3 through seat 4 is arranged perpendicular to the face of shoulder 11, with axis A parallel to the holes 10 and the base or flange 8 is constituted by a quadrangular radial flange (or other form, eg oval) which protrudes radially on the outside of housing of the annular element 7, in the bearing housing 3b of the case through seat 4 is arranged parallel to the face of shoulder 11, with the axis a perpendicular to the holes 10 and the base or flange 8 is constituted by a pedestal for example rectangular, oval or other shape, formed axially offset on one side of the housing 7.

With reference to FIG. 5, according to a last feature of the invention, around each of the holes 10, the base or flange 8, and both in the housing of the bearing case 3, the bearing housing has a coating-free elastomer.

The annular portions 22, however, are raised with respect to the annular edge 14 and the bottom wall 15, is recessed so as to contain laterally the elastomer layer 12 towards the holes 10, but are more "low" of the cantilevered extension in the front direction of the lip 18 and the peripheral edge 16, so that around each hole 10 is delimited a third shallow 23 deeper annular shallow of 21 and empty, devoid of elastomer coating 12 (FIG. 5).

Thanks to the geometry and to the choice of the materials described, is obtained to prevent in use effectively infiltration of water or dirt between the base or flange 8 and the surface 6 against which the bearing housing 3 or 3b is mounted, for avoiding the stagnations which are applied to the complexes of the prior art support resulting obstacle to the formation of bacterial colonies. Furthermore, the elastomer layer 12 allows to compensate and to recover any surface imperfections of the face 11 of the shoulder and/or the surface 6, and also defects of coplanarity between face 11 and surface 6.

Thanks to the fact that the peripheral edge 12 is disposed flush with the side wall 17 in undeformed conditions of the lip 18 the edge 16 and the lip 18 are protected from shocks or damage during the handling of the housing 3,3b bearing, for examples during the assembly phases of the 1,1b support assembly.

Conversely, when the 3,3b bearing housing is fixed with screws to the frame 5, the lip 18, thanks to its shape, trims towards the outside, ensuring the complete sealing in fluidtight manner the entire perimeter of the base or flange 8. at the same time, the presence of the raised edge 14 and the annular raised areas 22 contain laterally the expansion/deformation of the elastomer layer 12 during the tightening of the screws, preventing any damage of the same.

All the objects of the invention are therefore achieved.

The invention claimed is:

1. A bearing housing comprising:
a housing element adapted to receive a bearing therein, the bearing being configured for rotation about an axis of symmetry;
a base or flange configured to secure onto a machinery framework and having a side wall defining a perimeter of the base or flange, the base or flange defining a plurality of through holes for receiving a plurality of fixing elements therein and having a shoulder face designed to face, in use, the machinery framework, the shoulder face being crossed by the plurality of through holes, the shoulder face being perpendicular to the axis of symmetry;
wherein the housing element is made of a molded polymeric material; and
wherein the base or flange has the shoulder face thereof covered by a layer of elastomeric material integrally fixed in one piece with the base or flange, wherein the layer of elastomeric material is configured to contact, in use, the machinery framework such that the layer of elastomeric material is configured to be sandwiched, in use, between the housing and the machinery framework, the layer of elastomeric material having an annular lip along a housing peripheral edge, the annular lip bordering a frusto-conical recess in the layer of elastomeric material, a peripheral edge of the layer of elastomeric material being flush with the side wall of the base or flange.

2. A bearing housing according to claim 1, wherein the layer of elastomeric material covering the shoulder face of the base or flange has been integrally co-molded in one piece with the base or flange by using an elastomeric material which is compatible with the polymeric material used to make the housing element, the base or flange being integral in one piece with the housing element as it has been integrally molded in one piece with the housing element.

3. A bearing housing according to claim 1, wherein the housing element and the base or flange are obtained in one piece by molding a polymeric material filled with a fibrous reinforcing filler.

4. A bearing housing according to claim 3, wherein the housing element and the base or flange are obtained by molding in one piece polypropylene filled with fiberglass.

5. A bearing housing according to claim 1 wherein the base or flange has, on the side of its shoulder face and along the whole periphery thereof, an annular rim, which protrudes in a cantilevered fashion with respect to the shoulder face in a direction which is substantially perpendicular to the base or flange and which delimits, within the base or flange and on the side of the shoulder face, a first shallow recess; the layer of elastomeric material filling the first shallow recess and having a greater height than a cantilevered extension of the annular rim with respect to the shoulder face, a peripheral rim of the layer of elastomeric material extending to cover the annular rim frontally and completely, being flush with the side wall of the base or flange.

6. A bearing housing according to claim 1, wherein the base or flange is provided, at the through holes, with reinforcing metal bushes which laterally delimit the through holes and which were co-molded with the base or flange perpendicular to the shoulder face.

7. A bearing assembly for movable, rotating or sliding shafts, comprising a bearing adapted to receive the movable shaft, and a bearing housing according to claim 1 having a through seat in which the bearing is received; the through seat being arranged perpendicular or parallel to the shoulder face.

\* \* \* \* \*